(12) United States Patent
Winiecki

(10) Patent No.: US 9,361,607 B1
(45) Date of Patent: Jun. 7, 2016

(54) MOTOR VEHICLE MONITORING METHOD FOR DETERMINING DRIVER NEGLIGENCE OF AN ENGINE

(71) Applicant: Kenneth Carl Steffen Winiecki, Cupertino, CA (US)

(72) Inventor: Kenneth Carl Steffen Winiecki, Cupertino, CA (US)

( * ) Notice: Subject to any disclaimer, the term of this patent is extended or adjusted under 35 U.S.C. 154(b) by 0 days.

(21) Appl. No.: 15/045,602

(22) Filed: Feb. 17, 2016

Related U.S. Application Data

(63) Continuation-in-part of application No. 14/705,163, filed on May 6, 2015, now Pat. No. 9,299,109.

(60) Provisional application No. 62/025,909, filed on Jul. 17, 2014, provisional application No. 62/025,911, filed on Jul. 17, 2014, provisional application No. 62/025,915, filed on Jul. 17, 2014, provisional application No. 62/025,917, filed on Jul. 17, 2014.

(51) Int. Cl.

| *G06Q 20/10* | (2012.01) |
| *B60Q 9/00* | (2006.01) |
| *G06Q 40/08* | (2012.01) |
| *G01C 22/00* | (2006.01) |
| *G06F 19/00* | (2011.01) |
| *G06M 1/30* | (2006.01) |
| *G07C 5/08* | (2006.01) |
| *G01C 21/36* | (2006.01) |

(52) U.S. Cl.
CPC ............... *G06Q 20/102* (2013.01); *B60Q 9/00* (2013.01); *G06Q 40/08* (2013.01); *G01C 21/3629* (2013.01); *G01C 22/00* (2013.01); *G06F 19/00* (2013.01); *G06M 1/303* (2013.01); *G07C 5/085* (2013.01)

(58) Field of Classification Search
CPC ..... G06Q 10/00; G06Q 50/30; G06Q 20/102; G06Q 40/08; G07C 5/008; G07C 5/00; B60W 40/09; F02D 41/0245; F02D 41/0027; G06F 17/00; G06F 19/00; G08G 1/0967; H03W 4/02; F02M 21/02; G02D 41/02; G05D 1/02; B60Q 9/00; G01C 22/00; G06M 1/303

See application file for complete search history.

(56) References Cited

U.S. PATENT DOCUMENTS

| 7,610,128 | B2 * | 10/2009 | O'Connor | ............... | G07C 5/085 235/95 R |
| 2008/0294312 | A1 * | 11/2008 | O'Connor | ............... | G07C 5/085 701/32.5 |
| 2015/0356795 | A1 * | 12/2015 | Warren | ................... | G07C 5/008 701/31.5 |

* cited by examiner

Primary Examiner — Behrang Badii

(57) ABSTRACT

A motor vehicle monitoring method for determining driver negligence is carried out by a company in order to determine a final assessment for the vehicle. The method for determining driver negligence enables the company to calculate an average revolutions per initial odometer value and an average revolutions per secondary odometer value, where the average revolutions per secondary odometer value is a direct indication about operating state of the vehicle or an action of an end user during a designated time period. Then the company is able to adjust the contact agreement for the designated time period upon the final assessment, wherein the responsible party that violates the contact agreement is only liable for the respective damages. The method for determining driver negligence also validates the odometer and speedometer values from illegal tampering.

20 Claims, 13 Drawing Sheets

MOTOR VEHICLE MONITORING METHOD FOR DETERMINING DRIVER NEGLIGENCE OF AN ENGINE

The current application is a continuation-in-part (CIP) application of a U.S. non-provisional application Ser. No. 14/705,163 filed on May 6, 2015. The U.S. non-provisional application Ser. No. 14/705,163 claims a priority to the U.S. Provisional Patent application Ser. No. 62/025,909 filed on Jul. 17, 2014, the U.S. Provisional Patent application Ser. No. 62/025,911 filed on Jul. 17, 2014, the U.S. Provisional Patent application Ser. No. 62/025,915 filed on Jul. 17, 2014 and the U.S. Provisional Patent application Ser. No. 62/025,917 filed on Jul. 17, 2014.

FIELD OF THE INVENTION

The present invention relates generally to the field of automotive systems. More specifically, the present invention is a method of determining a driver's negligence during the break-in period of a new engine, a lease agreement, a rental agreement, and an insurance premium calculation based upon monitoring, recording and communicating data representative of operator and vehicle driving characteristics.

BACKGROUND OF THE INVENTION

Most vehicle related companies such as rental companies, car dealerships, and insurance companies utilize the total mileage of a vehicle so that each of these companies are able to determine their respective contacts based upon the total mileage and other related variables. Although different variables are utilized by these companies, the total mileage of the vehicles is considered to be the most important aspect as the total mileage is directly related to the mechanical condition of the engine and the other components of the drivetrain. However, the relationship between the total mileage and the condition of the engine can be misleading in some instances. For example, some high mileage cars may have engines that have been well maintained and revved with low engine revolutions while some low mileage cars may have engines that have been abused and revved with high engine revolutions. Normally a buyer would purchase the lower mileage car assuming it has the better engine compared to the high mileage car. In relation to the example, the lower mileage car has the worse conditioned engine compared to the engine of the higher mileage car. This provides a real challenge for used car buyers because they cannot find out the how the engine of a particular used car is operated for by the previous owner. The rental companies, car dealerships, and insurance companies are also faced with this problem as they would only consider the total mileage and not the total number of engine revolutions along with the total mileage.

The present invention takes into consideration the number of total revolutions of the engine and the total distance traveled by the vehicle or the total runtime of the engine so that the average revolutions per distance unit can be calculated. Resulting data of the present invention can be displayed within the control panel of the vehicle and uploaded to a remote serve as the resulting data provides valuable information not only for car buyers but also for car dealers, car rental companies, insurance companies, and many other similar vehicle related entities. More specifically, the present invention is a method of determining a driver's negligence of an engine based upon monitoring, recording and communicating data representative of operator and vehicle driving characteristics. For example, the resulting data is reflective upon the drivers' willingness to not abide by new engine break in procedures is adjustable retrospectively and can be prospectively set by relating the break in driving characteristics to predetermined safety standards. The present invention also determines a vehicle lease surcharge, a vehicle rental surcharge, and an insurance premium calculation based upon monitoring, recording and communicating data representative of operator and vehicle driving characteristics. The present invention further provides protection against odometer and speedometer tampering through the monitoring, recording and communicating data representative of operator and vehicle driving characteristics.

DETAIL DESCRIPTIONS OF THE INVENTION

All illustrations of the drawings are for the purpose of describing selected versions of the present invention and are not intended to limit the scope of the present invention.

The present invention is a motor vehicle monitoring method for determining driver negligence of an engine. The present invention collects raw data elements in regards to engine revolutions and the distance traveled, which are representative of an operating state of the vehicle or an action of the operator of the vehicle. The total distance traveled by a vehicle, a plurality of engine revolutions, and an average revolutions per distance unit (ARDU) valve for the total distance traveled, which are utilized for the calculations of the present invention, are sequentially shown through an odometer of the vehicle. More specifically, the ARDU valve is calculated by an engine control unit (ECU) of the vehicle as the plurality of engine revolutions that is timestamped within the ECU is divided by the total distance traveled by the vehicle.

The steps of the present invention are implemented on a vehicle by a company so that the company is able to determine a final assessment for the vehicle through the present invention. In reference to FIG. 1, the present invention requires an initial odometer value and an average revolutions per initial odometer value for the vehicle so that the company can start implementing the present invention. More specifically, the initial odometer value is displayed within the odometer as the initial odometer value represents the total distance traveled by the vehicle up to that instant. The average revolutions per initial odometer value is displayed within the odometer as the average revolutions per initial odometer value is cautiously calculated through the division of a plurality of initial engine revolutions by the initial odometer value. In other words, the plurality of initial engine revolutions of the present invention represents the plurality of engine revolutions of the vehicle up to that instant.

Figure 1:
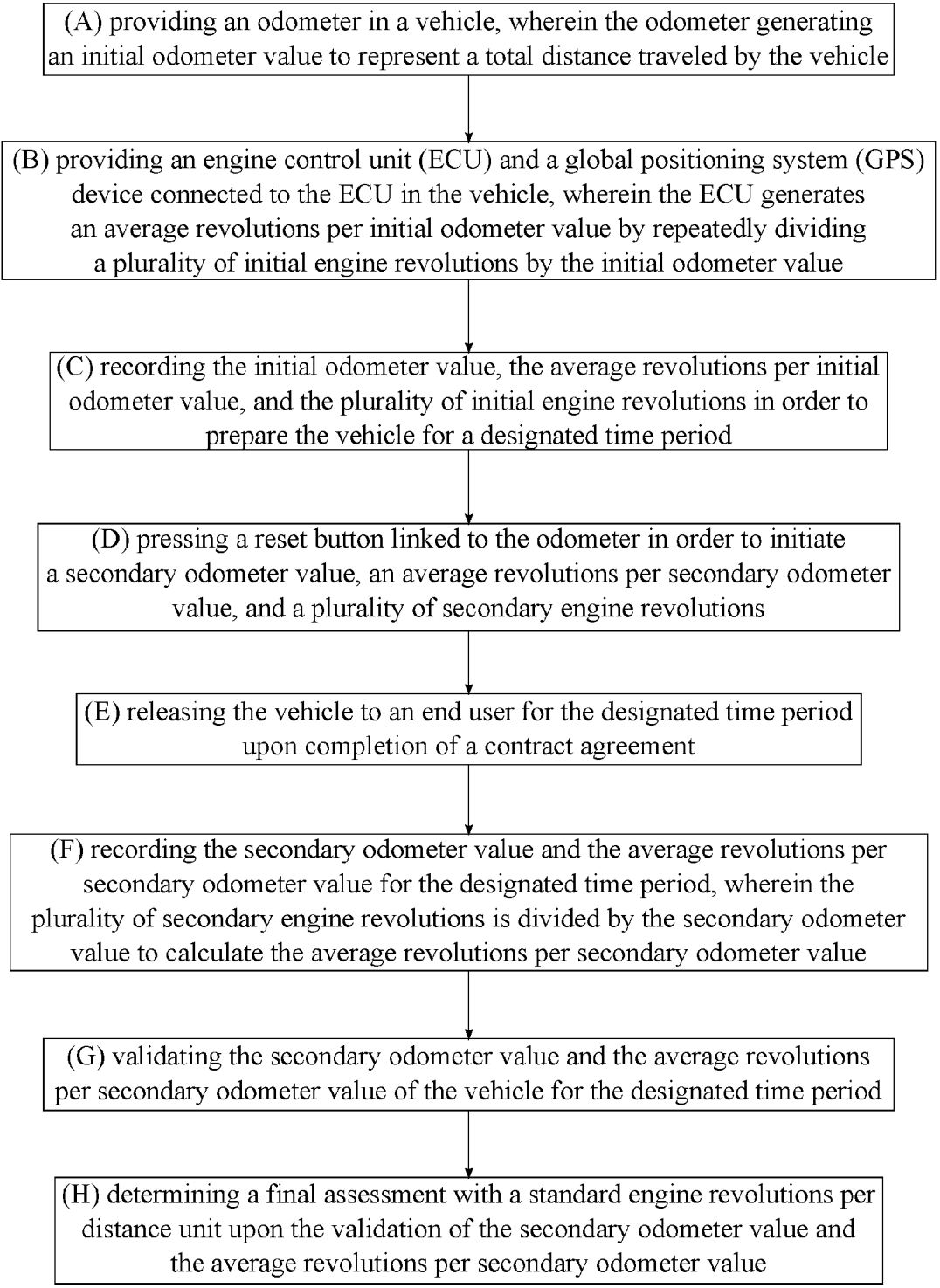
FIG. 1 is a flow chart illustrating the overall method of the present invention.

In reference to FIG. 1, the initial odometer value and the average revolutions per initial odometer value are then recorded by the company so that the vehicle can be prepped for a designated time period. The designated time period of the present invention is a time frame that is allocated for the vehicle by the company, wherein the time frame is either predetermined by the company or determined upon a mutual agreement between the company and an end user. For example, a three-year car lease, a five-year engine warranty, one-week car rental agreement, and a six-month insurance premium can be seen as the designated time period within the present invention. The designated time period represents the total time period that the company plans to implement the present invention, wherein the end user of the present invention becomes liable to unapproved mechanical issues of the vehicle that are identified through the present invention.

In reference to FIG. 1, a reset button that is linked to the odometer is pressed to initiate a secondary odometer value, an average revolutions per secondary odometer value, and a plurality of secondary engine revolutions for the present invention. Even though the reset button creates a temporally starting point for the secondary odometer value, the average revolutions per secondary odometer value, and the plurality of secondary engine revolutions within the odometer of the vehicle, the ECU separately records the total distance traveled, the ARDU value, and the plurality of engine revolutions of the vehicle. Then the vehicle is either released into the custody of the end user for the designated time period or monitored throughout the designated time period upon completion of a contract agreement. Additionally, the unapproved mechanical issues and other contract related conditions are informed to the end user during the completion of the contract agreement so that the end user is fully aware about the consequences of contract violations.

Once the end user returns the vehicle after the designated time period, the secondary odometer value and the average revolutions per secondary odometer value for the designated time period are recorded in order to continuously implement the present invention. More specifically, the secondary odometer value that represents the total distance traveled within the designated time period is displayed within a trip meter of the odometer as the reset button initiates the temporally starting point for the secondary odometer value. Similarly, the average revolutions per secondary odometer value and the plurality of secondary engine revolutions are also displayed within the trip meter of the vehicle as the reset button initiates the temporally starting point for average revolutions per secondary odometer value and the plurality of secondary engine revolutions. The average revolutions per secondary odometer value is calculated by the ECU through the division of the plurality of secondary engine revolutions by the secondary odometer value, wherein the total engine revolutions since the activation of the reset button represents the plurality of secondary engine revolutions.

Figure 3:
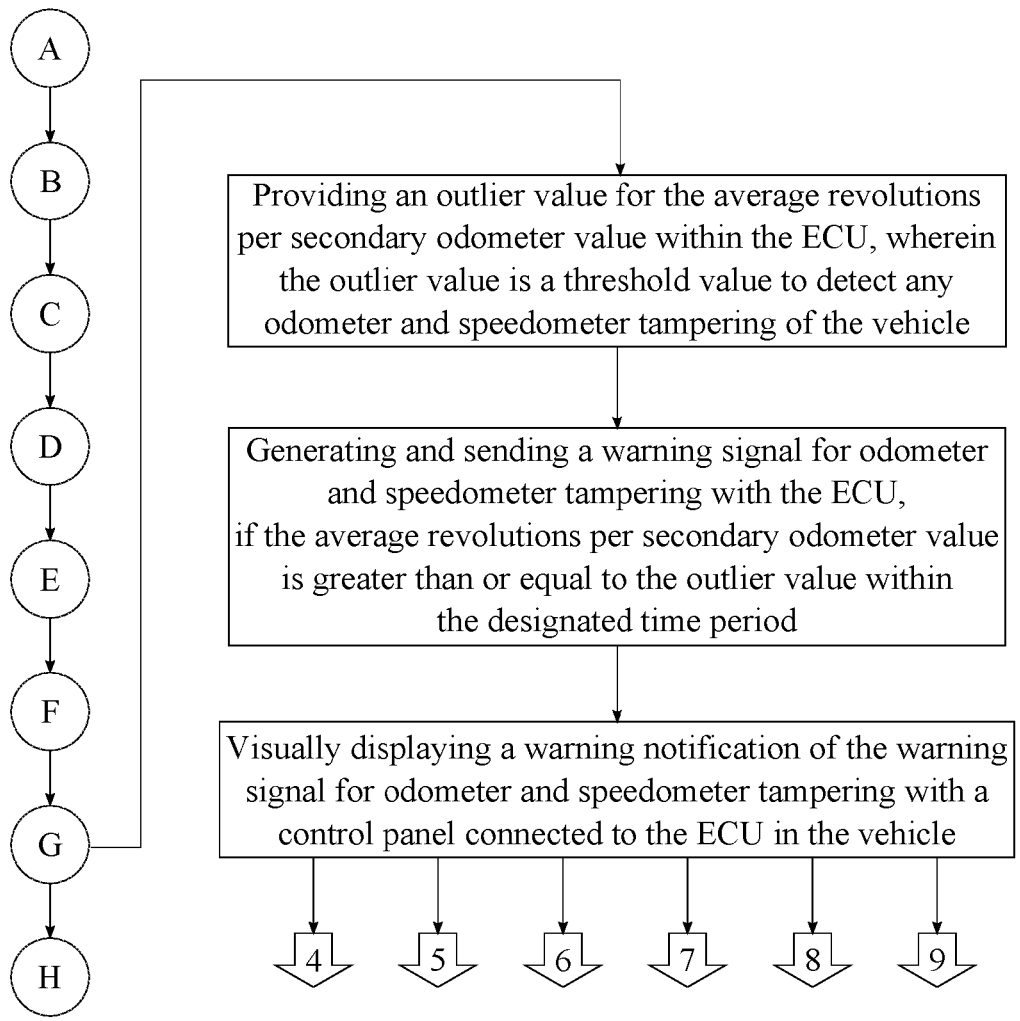
FIG. 3 is a flow chart illustrating the warning notification detections within the overall method of the present invention.

In reference to FIG. 3, the secondary odometer value and the average revolutions per secondary odometer value of the vehicle are validated for the designated time period. In other words, a control panel of the vehicle is checked for a warning notification for odometer and speedometer tampering as the warning notification indicates any kind of odometer irregularities. More specifically, an outlier value for the average revolutions per secondary odometer value is stored within the ECU of the vehicle so that the ECU is able to detect abnormal behavior of the average revolutions per secondary odometer value with respect to the secondary odometer value. The outlier value is preset slightly higher than the maximum allowable ARDU valve of the engine, where the outlier value functions as a threshold value to detect any odometer and speedometer tampering of the vehicle. At any given time, if the average revolutions per secondary odometer value of the vehicle is greater than or equal to the outlier value within the designated time period, the ECU determines that the odometer of the vehicle is compromised. Then the ECU generates and sends a warning signal for odometer and speedometer tampering to the control panel. Then the warning notification of the warning signal for odometer and speedometer tampering is visually displayed on the control panel, wherein the warning notification only provides a visual notification. Once the warning notification is displayed with the control panel, the ECU records an entity for the warning notification in order to keep track of the total number of displayed warning notifications for the vehicle. For example, if the vehicle has displayed twenty warning notifications during the designated time period, the ECU records twenty different entities for each of the warning notifications.

Figure 2:
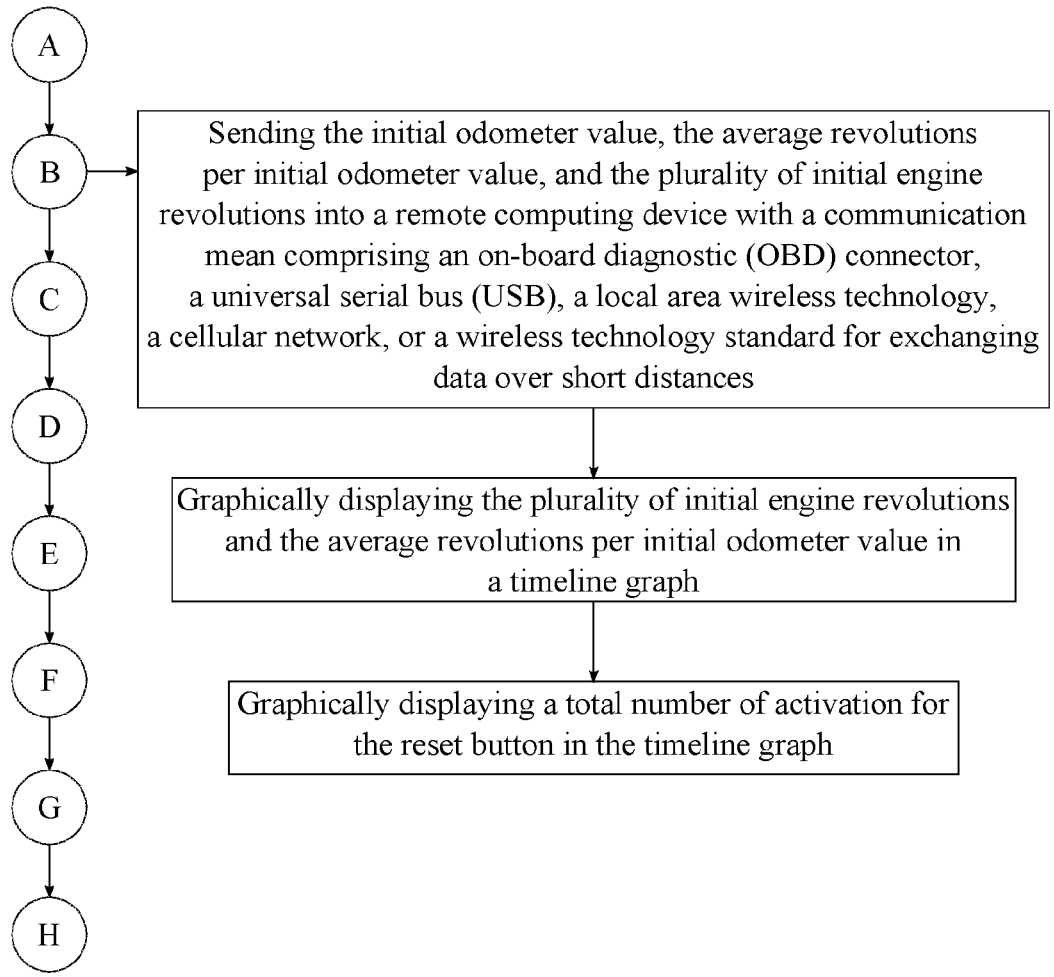
FIG. 2 is a flow chart illustrating visual display of the initial engine revolutions and the secondary engine revolutions within the overall method of the present invention.

In reference to FIG. 2, the ECU can also send the initial odometer value, the average revolutions per initial odometer value, and the plurality of initial engine revolutions into a remote computing device with a communication mean including, but is not limited to, an on-board diagnostic (OBD) connector, a universal serial bus (USB), a local area wireless technology, a cellular network, and a wireless technology standard for exchanging data over short distances. More specifically, the plurality of initial engine revolutions and the initial odometer value can be exported into the remote computing device so that the plurality of initial engine revolutions and the average revolutions per initial odometer value are able to graphically display on a timeline graph. As a result, the company is able to access the data regarding how the vehicle is driven by the end user of the vehicle in order to properly diagnose the condition of the engine and the driving style of the end user. The timeline graph also displays the total number of warning notification and the total number of activation for the reset button. This allows the company to visually identify any kind of unnecessary activities that may have been conducted during the designated time period. Since the total distance traveled, the ARDU value, and the plurality of engine revolutions of the vehicle respectively represent the initial odometer value, the average revolutions per initial odometer value, and the plurality of initial engine revolutions, the company is able to visually analyze the designated time period with respect to the overall timeline graph. Additionally, the company is also able to individually isolate small time periods within the designated time period to detect the outlier values. For example, the average revolutions per secondary engine revolutions of a vehicle can be less than the threshold value for the duration of the designated time period. However, the timeline graph may visually indicate small time periods where the average revolutions per secondary engine revolutions exceeds the threshold value. Then the company is able to determine the outcome of the final assessment with respect to the small time periods that exceeds the threshold value.

Figure 4:
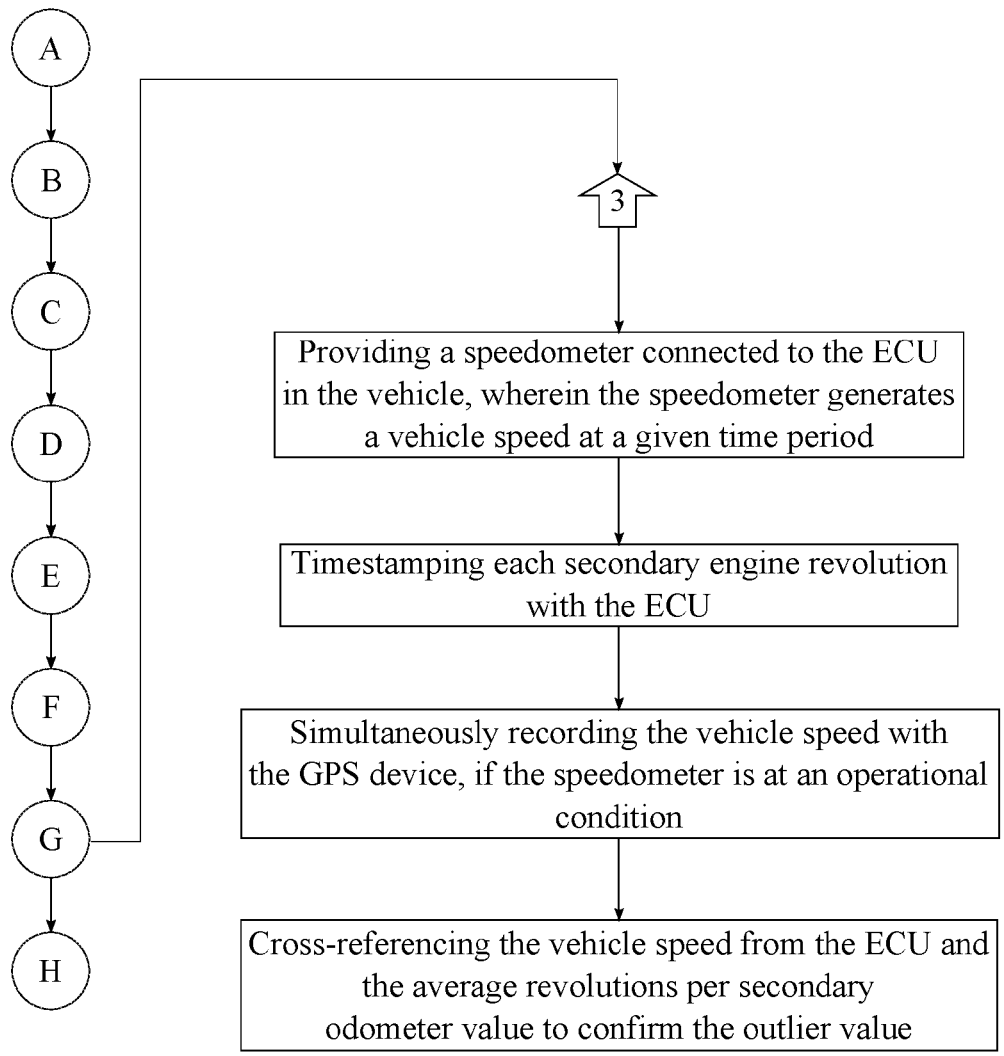
FIG. 4 is a flow chart illustrating the warning notification detections within the overall method of the present invention and the speedometer being operational.

In reference to FIG. 4, the outlier value for the average revolutions per secondary odometer value may occur due to excessive acceleration that is also known as the unnecessary engine revving. Since each secondary engine revolution is timestamped with the ECU, the ECU is able to keep track of the plurality of secondary revolutions throughout the designated time period. A speedometer of the vehicle generates a vehicle speed at a given time period and connected to the ECU, where the ECU simultaneously records the vehicle speed for each timestamped secondary engine revolution if the speedometer is at an operational condition. Then the ECU is able to cross-reference the vehicle speed from the speedometer and the average revolutions per secondary odometer value to confirm the outlier value of the designated time period. As a result, the ECU is able to conclude the cause of the outlier value from the vehicle speed from the speedometer and the average revolutions per secondary odometer value.

Figure 5:
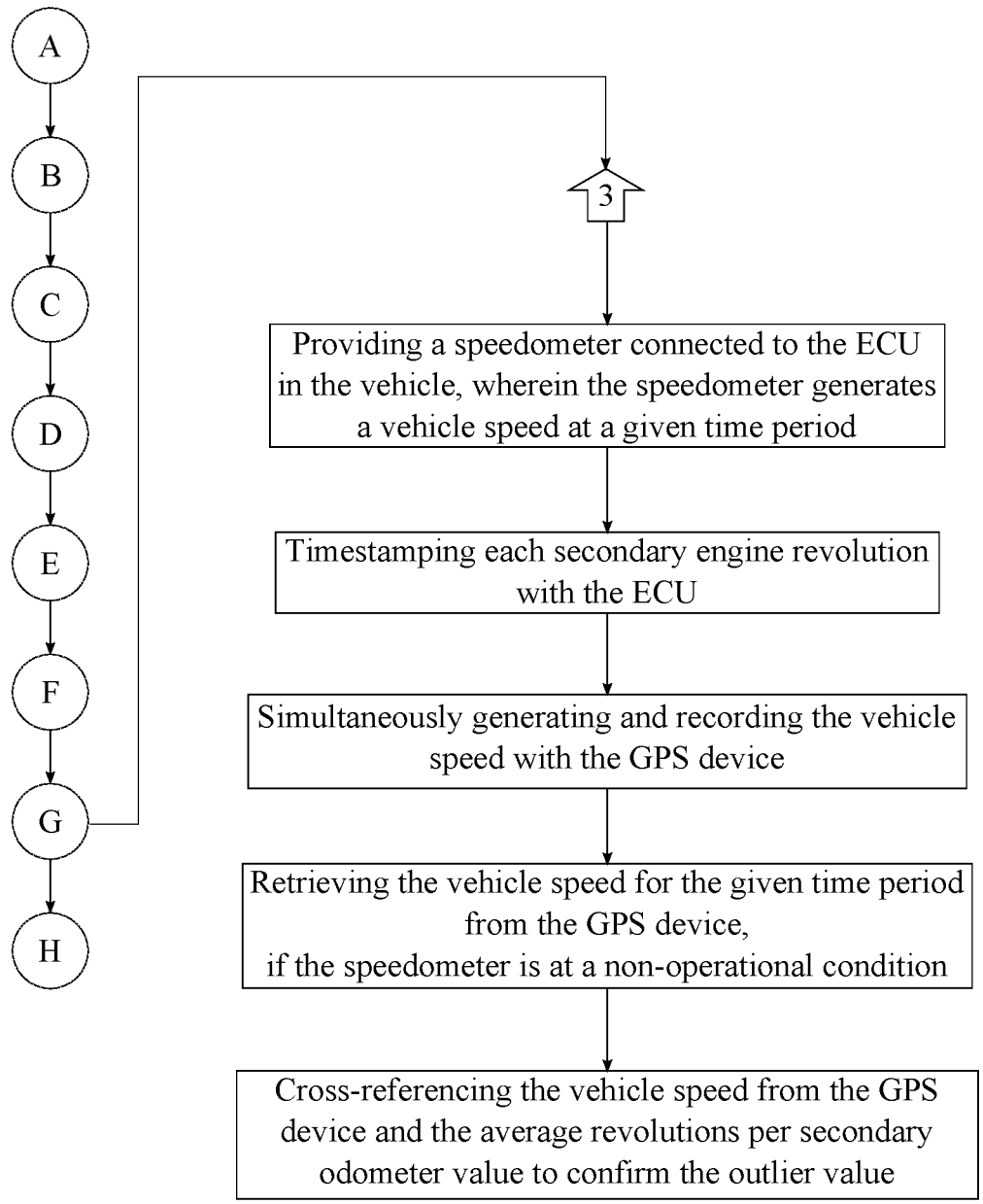
FIG. 5 is a flow chart illustrating the warning notification detections within the overall method of the present invention and the speedometer being non-operational.

In reference to FIG. 5, the outlier value for the average revolutions per secondary odometer value may occur due to excessive acceleration that is also known as the unnecessary engine revving. Since each secondary engine revolution is timestamped with the ECU, the ECU is able to keep track of the plurality of secondary revolutions throughout the designated time period. Generally, the speedometer of the vehicle generates the vehicle speed at a given time period while the ECU simultaneously records the vehicle speed for each timestamped secondary engine revolution when the speedometer is at an operational condition. Additionally, a global positioning system (GPS) device that is connected to the ECU also generates and records the vehicle speed. For example, the GPS device generates different information, including, but not limited to, the vehicle speed, spaced-based navigation coordinates, environmental conditions, and time information. However, if the speedometer is at a non-operation conditional due to any reason, the ECU retrieves the vehicle speed for the given time period from the GPS device. Then the ECU is able to cross-reference the vehicle speed from the GPS device and the average revolutions per secondary odometer value to confirm the outlier value of the designated time period. As a result, the ECU is able to conclude the cause of the outlier value from the vehicle speed from the GPS device and the average revolutions per secondary odometer value.

Figure 6:
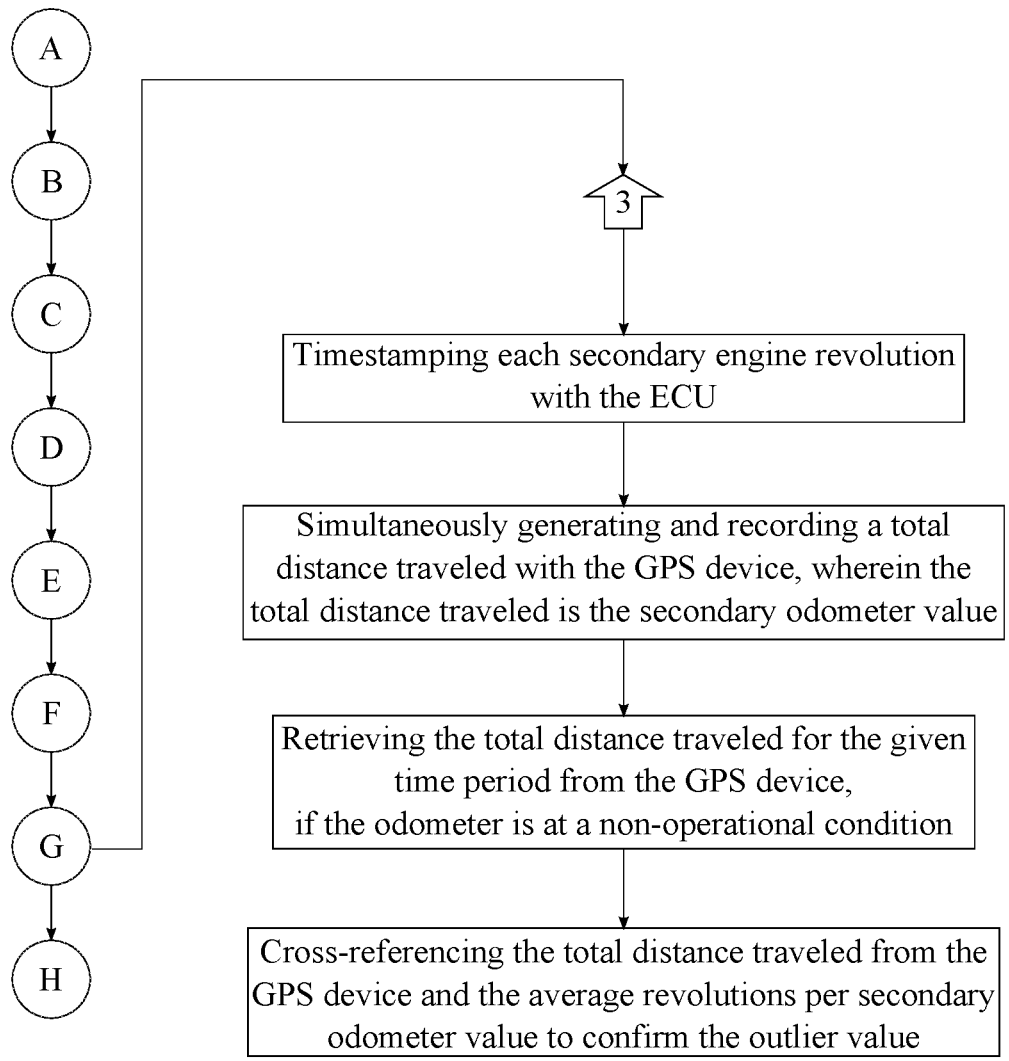
FIG. 6 is a flow chart illustrating the warning notification detections within the overall method of the present invention and the odometer being non-operational.

In reference to FIG. 6, the outlier value for the average revolutions per secondary odometer value may occur due to the non-operational condition of the odometer. Since each secondary engine revolution is timestamped with the ECU, the ECU is able to keep track of the plurality of secondary revolutions throughout the designated time period. Generally, the odometer of the vehicle generates the odometer value at a given time period while the ECU simultaneously records the vehicle speed for each timestamped secondary engine revolution when the speedometer is at an operational condition. Additionally, the GPS device generates and records a total distance traveled by the vehicle. In other words, the total distance traveled from the GPS device is equivalent to the secondary odometer value. However, if the odometer is at a non-operation conditional due to any reason, the ECU retrieves the total distance traveled for the given time period from the GPS device. Then the ECU is able to cross-reference the distance traveled from the GPS device and the average revolutions per secondary odometer value to confirm the outlier value of the designated time period. As a result, the ECU is able to conclude the cause of the outlier value from the total distance traveled from the GPS device and the average revolutions per secondary odometer value.

Figure 7:
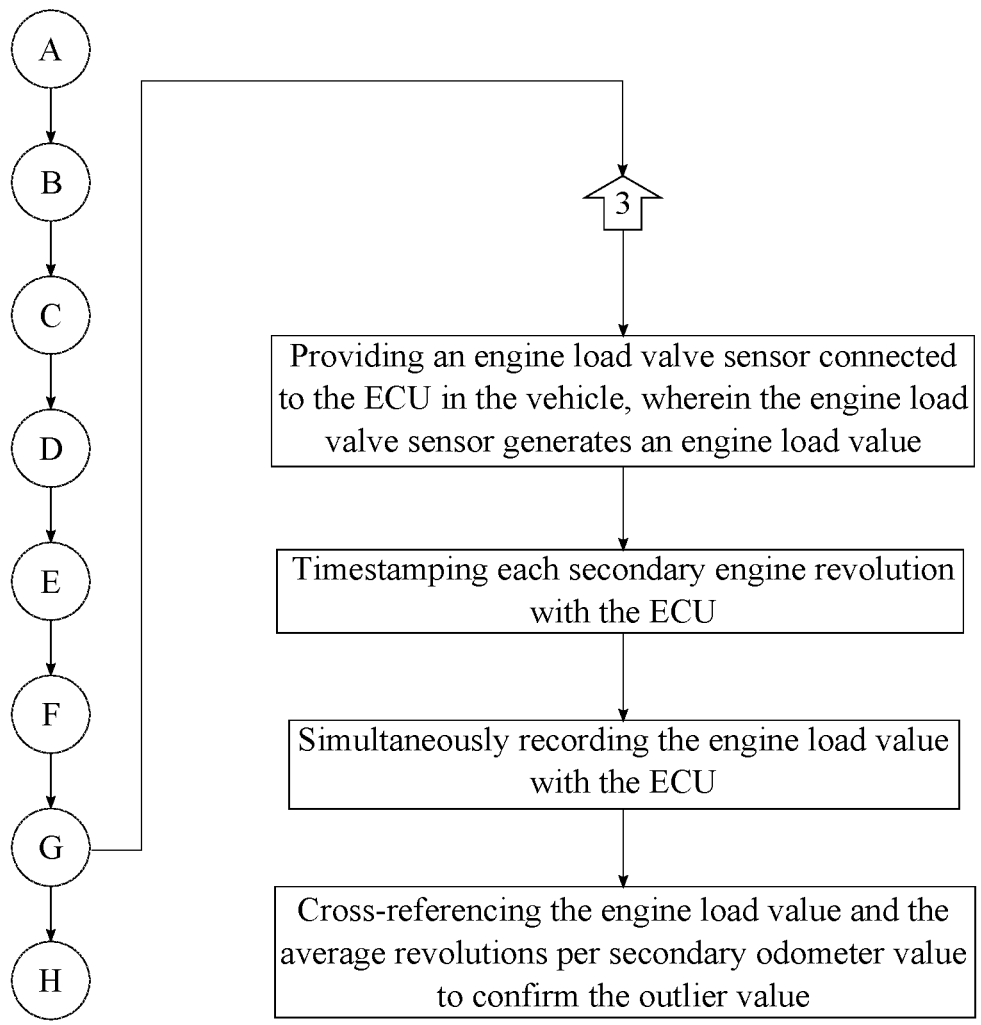
FIG. 7 is a flow chart illustrating the warning notification detections within the overall method of the present invention and the engine load valve.

In reference to FIG. 7, the outlier value for the average revolutions per secondary odometer value may occur due to heavy towing or pulling. Since each secondary engine revolution is timestamped with the ECU, the ECU is able to keep track of the plurality of secondary revolutions throughout the designated time period. An engine load valve sensor of the vehicle generates an engine load value of the vehicle at a given time period and connected to the ECU so that the ECU is able to record the engine load value. The ECU is then able to cross-reference the engine load value from the engine load valve sensor and the average revolutions per secondary odometer value to confirm the outlier value of the designated time period. As a result, the ECU is able to conclude the cause of the outlier value from the engine load value and the average revolutions per secondary odometer value.

Figure 8:
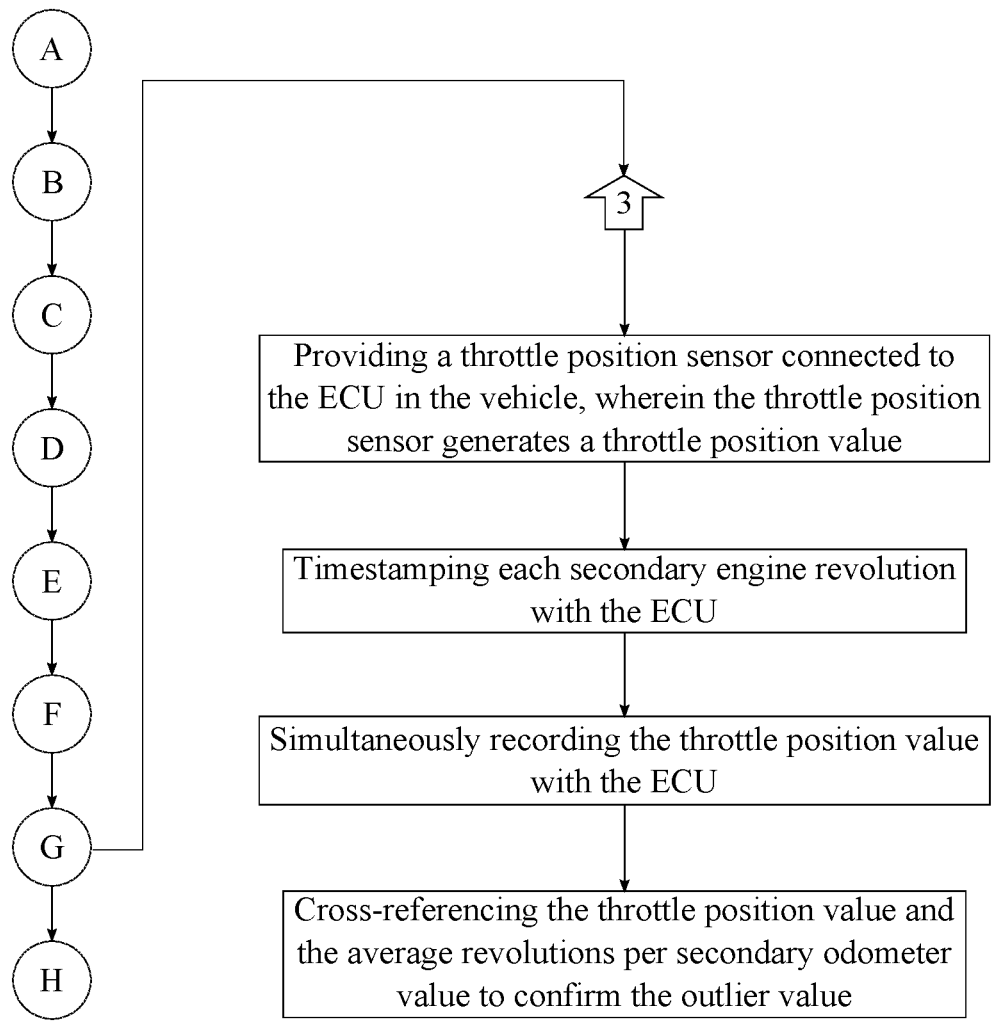
FIG. 8 is a flow chart illustrating the warning notification detections within the overall method of the present invention and throttle position value.

In reference to FIG. 8, the outlier value for the average revolutions per secondary odometer value may occur due to unnecessary engine loads. Since each secondary engine revolution is timestamped with the ECU, the ECU is able to keep track of the plurality of secondary revolutions throughout the designated time period. A throttle position sensor of the vehicle generates a throttle position value of the vehicle at a given time period and connected to the ECU so that the ECU is able to record the throttle position value. The ECU is then able to cross-reference the throttle position value from the throttle position sensor and the average revolutions per secondary odometer value to confirm the outlier value of the designated time period. As a result, the ECU is able to conclude the cause of the outlier value from the throttle position value and the average revolutions per secondary odometer value.

Figure 9:
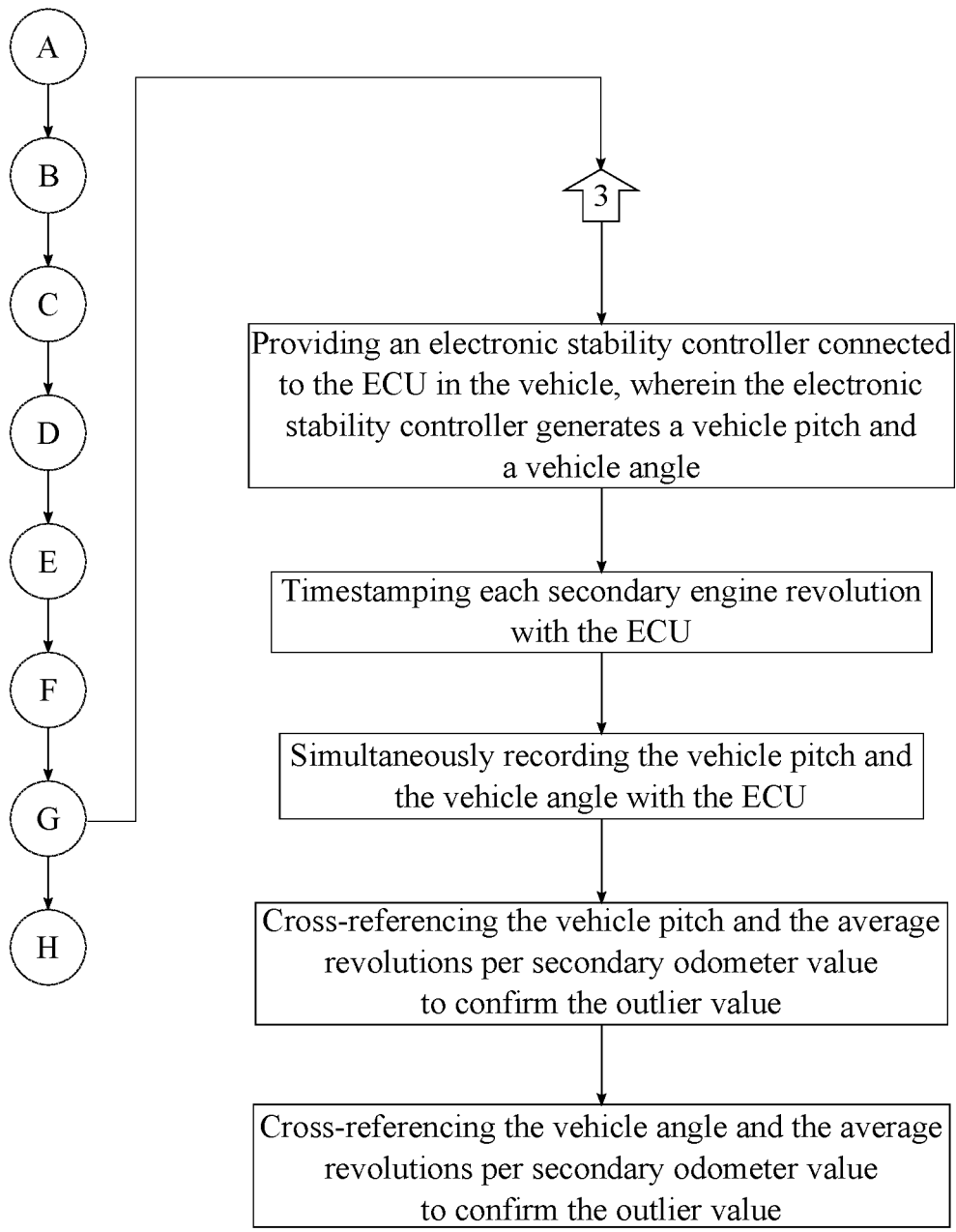
FIG. 9 is a flow chart illustrating the warning notification detections within the overall method of the present invention and the vehicle pitch and vehicle angle.

In reference to FIG. 9, the outlier value for the average revolutions per secondary odometer value may occur due to different road profiles such as uphill and downhill. Since each secondary engine revolution is timestamped with the ECU, the ECU is able to keep track of the plurality of secondary revolutions throughout the designated time period. An electronic stability controller of the vehicle generates a vehicle pitch and vehicle angle at a given time period and connected to the ECU so that the ECU is able to record the vehicle pitch and the vehicle angle. Then the ECU is able to cross-reference the vehicle pitch from the electronic stability controller and the average revolutions per secondary odometer value to confirm the outlier value of the designated time period. As a result, the ECU is able to conclude the cause of the outlier value from the vehicle pitch and the average revolutions per secondary odometer value. Additionally, the ECU is also able to cross-reference the vehicle angle from the electronic stability controller and the average revolutions per secondary odometer value to confirm the outlier value of the designated time period. As a result, the ECU is able to conclude the cause of the outlier value from the vehicle angle and the average revolutions per secondary odometer value.

After validating the secondary odometer value and the average revolutions per secondary odometer value, the final assessment can be determined with a standard engine revolutions per distance unit as the final step of the present invention. The standard engine revolutions per distance unit provides a guideline for the average revolutions per secondary odometer value so that necessary changes can be implemented to the contract agreement. The changes that can be made to the contract agreement upon the average revolutions per secondary odometer value are pre-stated and explained to the end user before the completion of the contract agreement. Then the company is able to adjust the contact agreement upon the final assessment, wherein the responsible party that violates the contact agreement is only liable for the respective damages or the unapproved mechanical issues.

Figure 10:
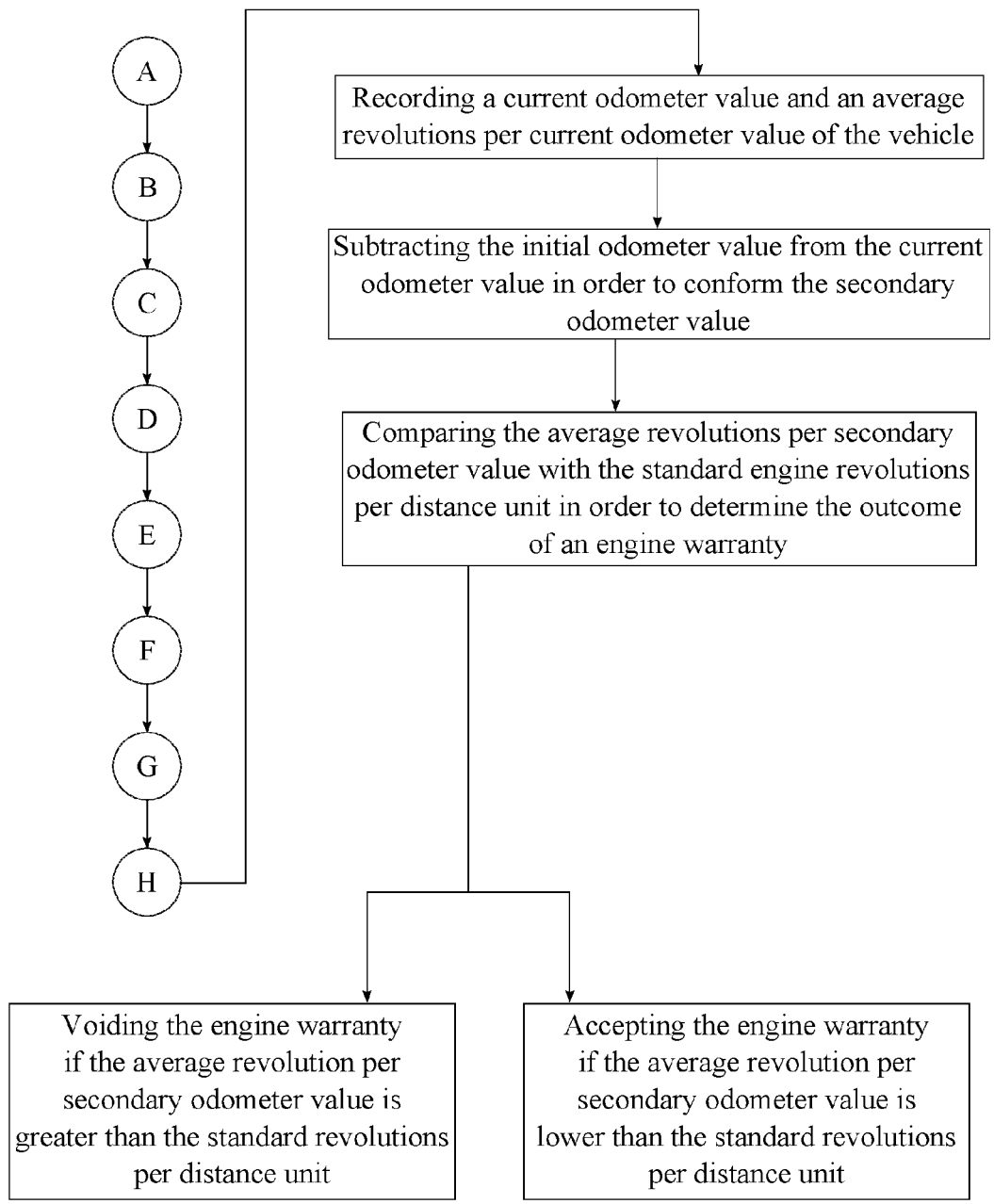
FIG. 10 is a flow chart illustrating the overall method of the present invention, wherein the present invention is implemented to determine the outcome of the engine warranty.

In reference to FIG. 10, the present invention can be implemented by the car dealership in order to properly conclude the outcome of an engine warranty, where the engine warranty becomes the contract agreement for the vehicle. More specifically, after validating the secondary odometer value and the average revolutions per secondary odometer value, a current odometer value and an average revolutions per current odometer value of the vehicle are recorded by the company. Then the initial odometer value is subtracted from the current odometer value in order to conform the secondary odometer value. The average revolutions per secondary odometer value is then compared with the standard engine revolutions per distance unit in order to determine the outcome of the engine warranty in the event of an engine failure during the break in period of the engine. For example, if the average revolutions per secondary odometer value is greater than the standard engine revolutions per distance unit, the car dealership can conclude that the engine failure during the break in period occurs due to the operating state of the vehicle and the negligent actions of the end user. As a result, the car dealership can void the engine warranty as the final assessment. However, if the average revolutions per secondary odometer value is lower than the standard engine revolutions per distance unit, the car dealership can conclude that the engine failure during the break in period occurs due to a defected engine. As a result, the car dealership accepts the engine warranty as the final assessment.

Figure 11:
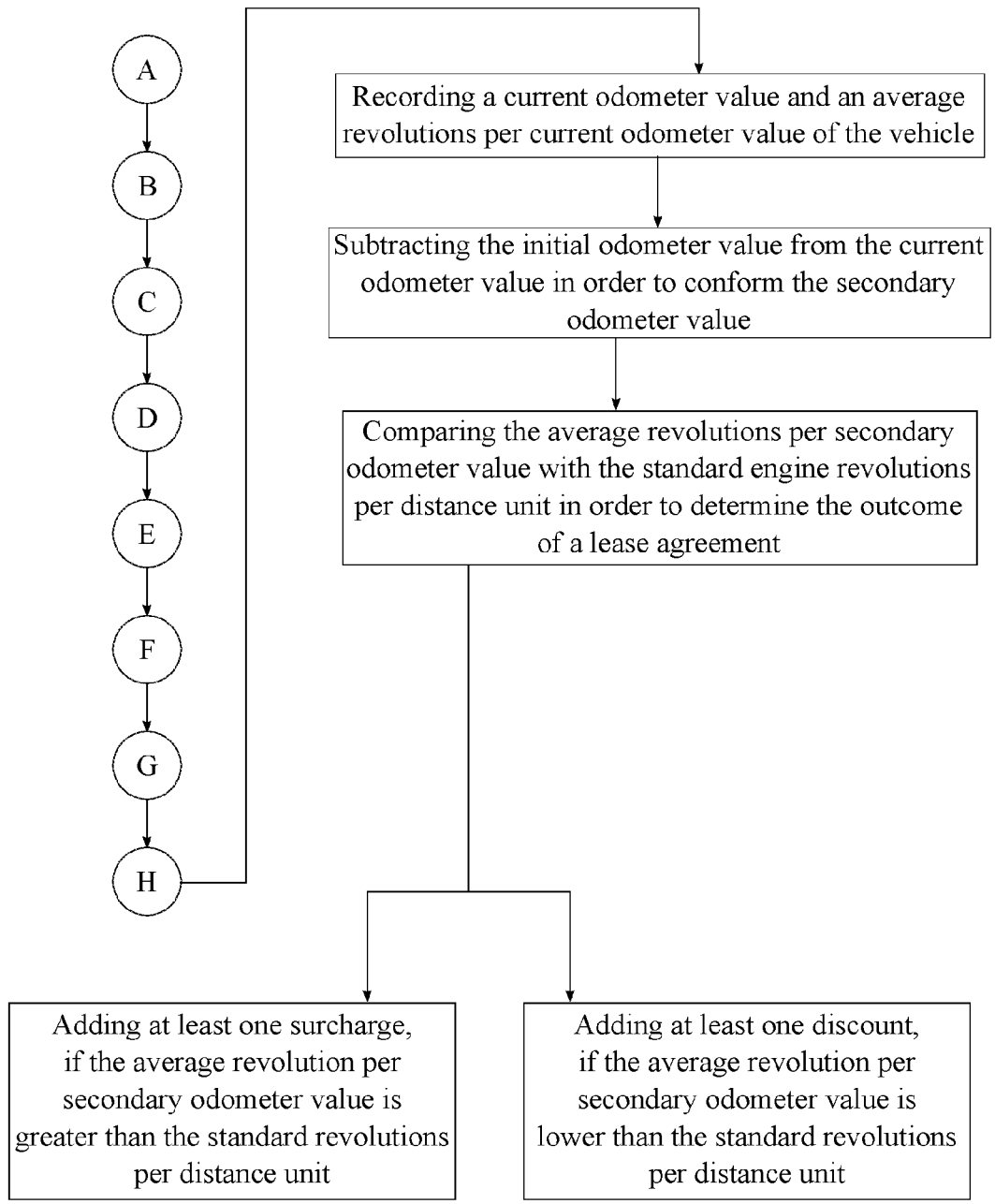
FIG. 11 is a flow chart illustrating the overall method of the present invention, wherein the present invention is implemented to determine the outcome of the lease agreement.

In reference to FIG. 11, the present invention can be implemented by the car dealership in order to properly conclude the outcome of a lease agreement, where the lease agreement becomes the contract agreement for the vehicle. More specifically, after validating the secondary odometer value and the average revolutions per secondary odometer value, a current odometer value and an average revolutions per current odometer value of the vehicle are recorded by the company. Then the initial odometer value is subtracted from the current odometer value in order to conform the secondary odometer value. The average revolutions per secondary odometer value is then compared with the standard engine revolutions per distance unit in order to determine the outcome of the lease agreement after the vehicle has been returned. For example, if the average revolutions per secondary odometer value is greater than the standard engine revolutions per distance unit, the car dealership can conclude that at least one surcharge should be added due to the operating state of the vehicle and the negligent actions of the end user. As a result, the car dealership adds the at least one surcharge to the lease agreement as the final assessment. However, if the average revolutions per secondary odometer value is lower than the standard engine revolutions per distance unit, the car dealership can conclude that at least one discount should be added due to compliance of the end user. As a result, the car dealership adds the at least one discount to the lease agreement as the final assessment.

Figure 12:
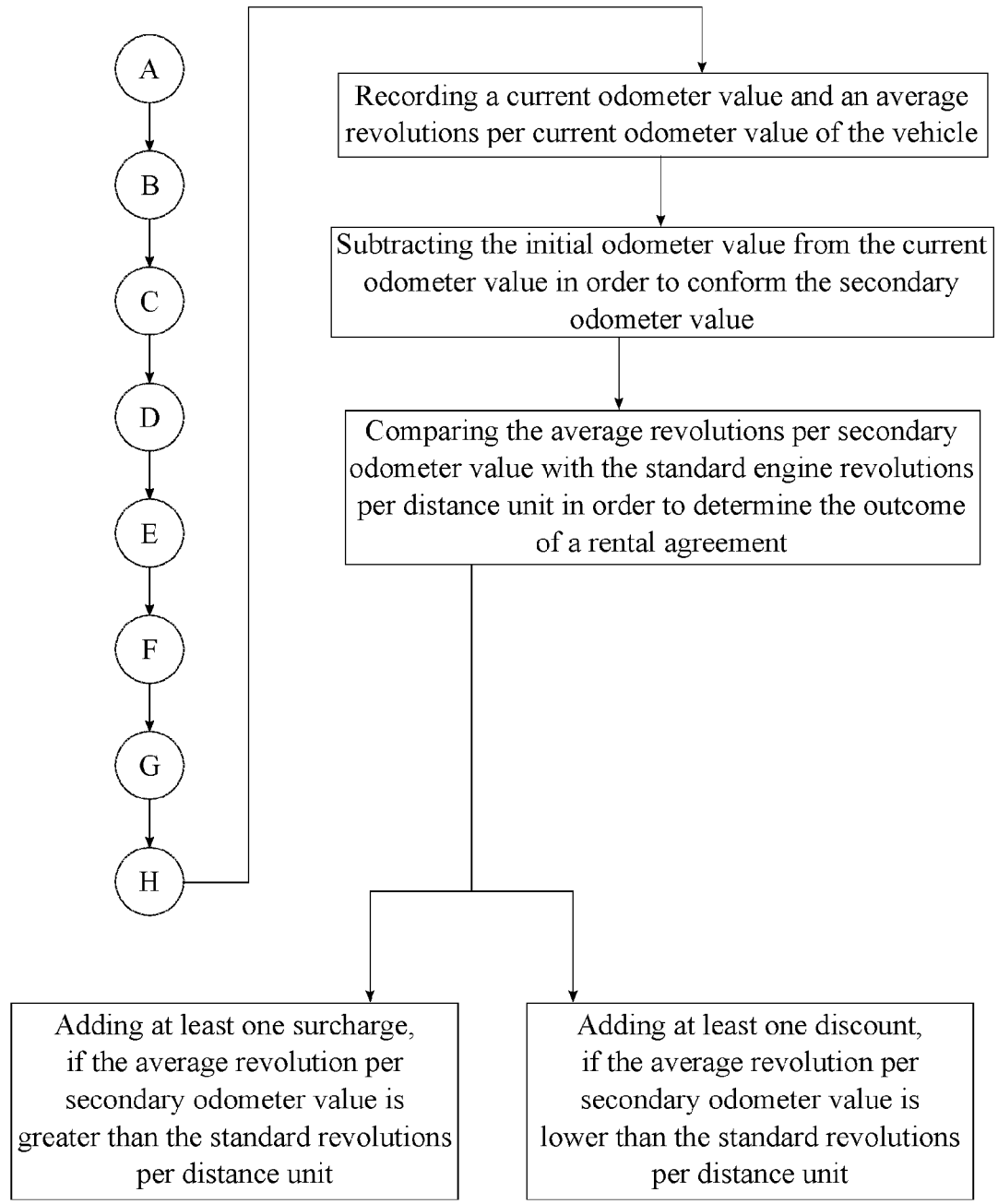
FIG. 12 is a flow chart illustrating the overall method of the present invention, wherein the present invention is implemented to determine the outcome of the rental agreement.

In reference to FIG. 12, the present invention can be implemented by the car rental companies in order to properly conclude the outcome of a rental agreement, where the rental agreement becomes the contract agreement for the vehicle. More specifically, after validating the secondary odometer value and the average revolutions per secondary odometer value, a current odometer value and an average revolutions per current odometer value of the vehicle are recorded by the company. Then the initial odometer value is subtracted from the current odometer value in order to conform the secondary odometer value. The average revolutions per secondary odometer value is then compared with the standard engine revolutions per distance unit in order to determine the outcome of the rental agreement after the vehicle has been returned. For example, if the average revolutions per secondary odometer value is greater than the standard engine revolutions per distance unit, the car rental company may conclude that at least one surcharge should be added due to the operating state of the vehicle and the negligent actions of the end user. As a result, the car rental company adds the at least one surcharge to the rental agreement as the final assessment. However, if the average revolutions per secondary odometer value is lower than the standard engine revolutions per distance unit, the car rental company may conclude that at least one discount should be added due to compliance of the end user. As a result, the car rental company adds the at least one discount to the rental agreement as the final assessment.

Figure 13:
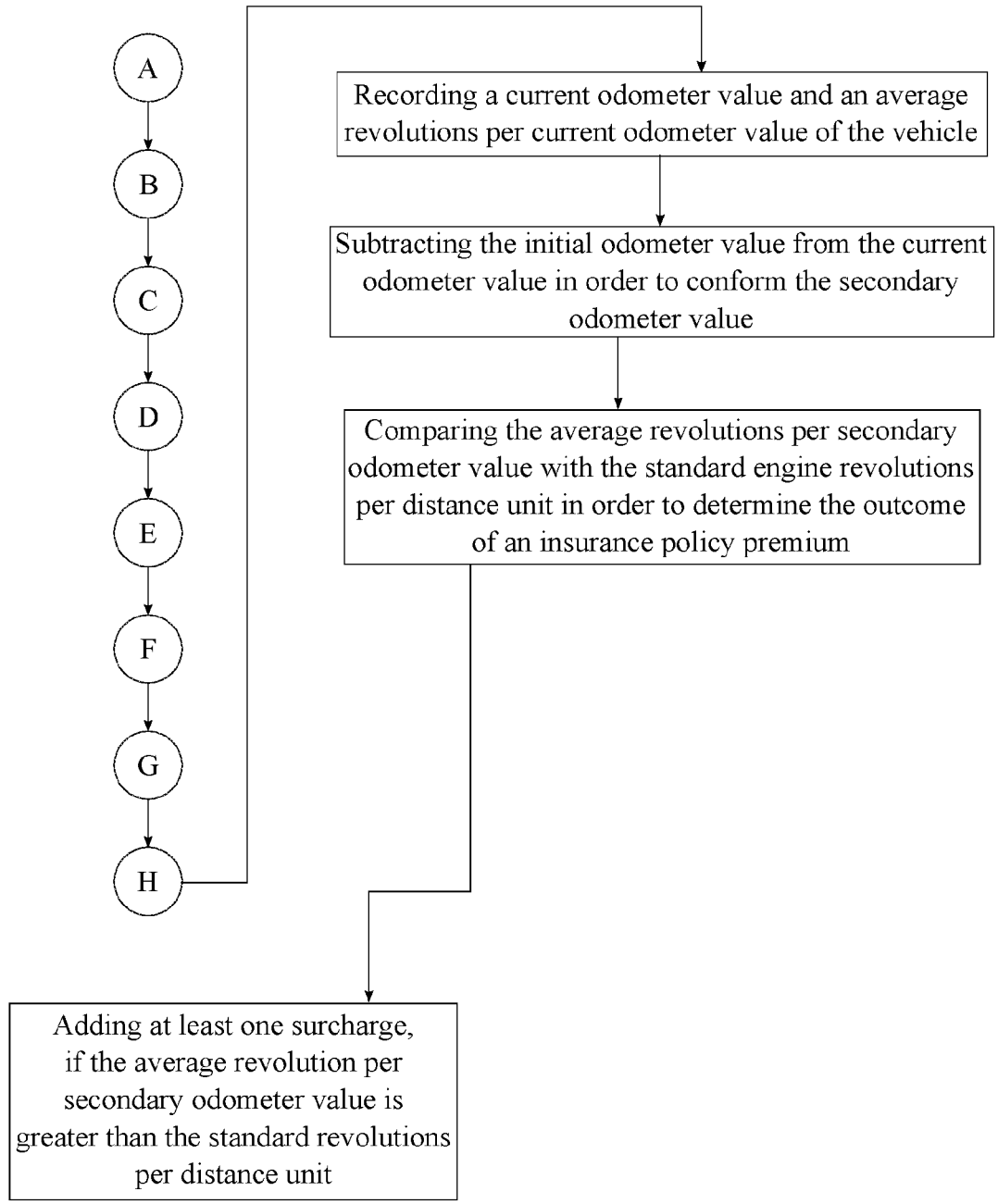
FIG. 13 is a flow chart illustrating the overall method of the present invention, wherein the present invention is implemented to determine the outcome of the insurance policy premium.

In reference to FIG. 13, the present invention can be implemented by the insurance companies in order to properly conclude the outcome of an insurance premium policy, where the insurance policy premium becomes the contract agreement for the vehicle. More specifically, after validating the secondary odometer value and the average revolutions per secondary odometer value, a current odometer value and an average revolutions per current odometer value of the vehicle are recorded by the company. Then the initial odometer value is subtracted from the current odometer value in order to conform the secondary odometer value. The average revolutions per secondary odometer value is then compared with the standard engine revolutions per distance unit in order to determine the outcome of the insurance policy premium. For example, if the average revolutions per secondary odometer value is greater than the standard engine revolutions per distance unit, the insurance company can conclude that at least one surcharge should be added due to the operating state of the vehicle and the negligent actions of the end user. As a result, the insurance company adds the at least one surcharge to the insurance policy premium as the final assessment. However, if the average revolutions per secondary odometer value is lower than the standard engine revolutions per distance unit, the insurance company can conclude that at least one discount should be added due to compliance of the end user. As a result, the insurance company adds the at least one discount to the insurance policy premium as the final assessment.

Although the invention has been explained in relation to its preferred embodiment, it is to be understood that many other possible modifications and variations can be made without departing from the spirit and scope of the invention as hereinafter claimed.

What is claimed is:
1. A method of monitoring a vehicle for determining driver negligence, the method comprises the step of:
(A) providing an odometer in a vehicle, wherein the odometer generating an initial odometer value to represent a total distance traveled by the vehicle;

(B) providing an engine control unit (ECU) and a global positioning system (GPS) device connected to the ECU in the vehicle, wherein the ECU generates an average revolutions per initial odometer value by repeatedly dividing a plurality of initial engine revolutions by the initial odometer value;

(C) recording the initial odometer value, the average revolutions per initial odometer value, and the plurality of initial engine revolutions in order to prepare the vehicle for a designated time period;

(D) pressing a reset button linked to the odometer in order to initiate a secondary odometer value, an average revolutions per secondary odometer value, and a plurality of secondary engine revolutions;

(E) releasing the vehicle to an end user for the designated time period upon completion of a contract agreement;

(F) recording the secondary odometer value and the average revolutions per secondary odometer value for the designated time period, wherein the plurality of secondary engine revolutions is divided by the secondary odometer value to calculate the average revolutions per secondary odometer value;

(G) validating the secondary odometer value and the average revolutions per secondary odometer value of the vehicle for the designated time period; and (H) determining a final assessment with a standard engine revolutions per distance unit upon the validation of the secondary odometer value and the average revolutions per secondary odometer value.

2. The method of monitoring a vehicle for determining driver negligence, the method as claimed in claim 1 comprises the step of:

sending the initial odometer value, the average revolutions per initial odometer value, and the plurality of initial engine revolutions into a remote computing device with a communication mean comprising an on-board diagnostic (OBD) connector, a universal serial bus (USB), a local area wireless technology, a cellular network, or a wireless technology standard for exchanging data over short distances;

graphically displaying the plurality of initial engine revolutions and the average revolutions per initial odometer value in a timeline graph; and graphically displaying a total number of activation for the reset button in the timeline graph.

3. The method of monitoring a vehicle for determining driver negligence, the method as claimed in claim 1 comprises the step of:

providing an outlier value for the average revolutions per secondary odometer value within the ECU, wherein the outlier value is a threshold value to detect any odometer and speedometer tampering of the vehicle;

generating and sending a warning signal for odometer and speedometer tampering with the ECU, if the average revolutions per secondary odometer value is greater than or equal to the outlier value within the designated time period; and visually displaying a warning notification of the warning signal for odometer and speedometer tampering with a control panel connected to the ECU in the vehicle.

4. The method of monitoring a vehicle for determining driver negligence, the method as claimed in claim 3 comprises the step of:

providing a speedometer connected to the ECU in the vehicle, wherein the speedometer generates a vehicle speed at a given time period;

timestamping each secondary engine revolution with the ECU;

simultaneously recording the vehicle speed with the ECU, if the speedometer is at an operational condition; and cross-referencing the vehicle speed from the ECU and the average revolutions per secondary odometer value to confirm the outlier value.

5. The method of monitoring a vehicle for determining driver negligence, the method as claimed in claim 3 comprises the step of:

providing a speedometer connected to the ECU in the vehicle, wherein the speedometer generates a vehicle speed at a given time period;

timestamping each secondary engine revolution with the ECU;

simultaneously generating and recording the vehicle speed with the GPS device;

retrieving the vehicle speed for the given time period from the GPS device, if the speedometer is at a non-operational condition; and cross-referencing the vehicle speed from the GPS device and the average revolutions per secondary odometer value to confirm the outlier value.

6. The method of monitoring a vehicle for determining driver negligence, the method as claimed in claim 3 comprises the step of:

timestamping each secondary engine revolution with the ECU;

simultaneously generating and recording a total distance traveled with the GPS device, wherein the total distance traveled is the secondary odometer value;

retrieving the total distance traveled for the given time period from the GPS device, if the odometer is at a non-operational condition; and cross-referencing the total distance traveled from the GPS device and the average revolutions per secondary odometer value to confirm the outlier value.

7. The method of monitoring a vehicle for determining driver negligence, the method as claimed in claim 3 comprises the step of:

providing an engine load valve sensor connected to the ECU in the vehicle, wherein the engine load valve sensor generates an engine load value;

timestamping each secondary engine revolution with the ECU;

simultaneously recording the engine load value with the ECU; and cross-referencing the engine load value and the average revolutions per secondary odometer value to confirm the outlier value.

8. The method of monitoring a vehicle for determining driver negligence, the method as claimed in claim 3 comprises the step of:

providing a throttle position sensor connected to the ECU in the vehicle, wherein the throttle position sensor generates a throttle position value;

timestamping each secondary engine revolution with the ECU;

simultaneously recording the throttle position value with the ECU; and cross-referencing the throttle position value and the average revolutions per secondary odometer value to confirm the outlier value.

9. The method of monitoring a vehicle for determining driver negligence, the method as claimed in claim 3 comprises the step of:

providing an electronic stability controller connected to the ECU in the vehicle, wherein the electronic stability controller generates a vehicle pitch and a vehicle angle;

timestamping each secondary engine revolution with the ECU;

simultaneously recording the vehicle pitch and the vehicle angle with the ECU;

cross-referencing the vehicle pitch and the average revolutions per secondary odometer value to confirm the outlier value; and cross-referencing the vehicle angle and the average revolutions per secondary odometer value to confirm the outlier value.

10. The method of monitoring a vehicle for determining driver negligence, the method as claimed in claim 1 comprises the step of:

recording a current odometer value and an average revolutions per current odometer value of the vehicle;

subtracting the initial odometer value from the current odometer value in order to conform the secondary odometer value; and comparing the average revolutions per secondary odometer value with the standard engine revolutions per distance unit in order to determine the outcome of an engine warranty.

11. The method as claimed in claim 10 comprises, wherein the engine warranty of the engine is voided as the final assessment, if the average revolutions per secondary odometer value is greater than the standard engine revolutions per distance unit.

12. The method as claimed in claim 10 comprises, wherein the engine warranty of the engine is accepted as the final assessment, if the average revolutions per secondary odometer value is lower than the standard engine revolutions per distance unit.

13. The method as claimed in claim 1 comprises the steps of:

recording a current odometer value and an average revolutions per current odometer value of the vehicle;

subtracting the initial odometer value from the current odometer value in order to conform the secondary odometer value; and comparing the average revolutions per secondary odometer value with the standard engine revolutions per distance unit in order to determine the outcome of a lease agreement.

14. The method as claimed in claim 13 comprises, wherein at least one surcharge is added to the lease agreement as the final assessment, if the average revolutions per secondary odometer value is greater than the standard engine revolutions per distance unit.

15. The method as claimed in claim 13 comprises, wherein at least one discount is added to the lease agreement as the final assessment, if the average revolutions per secondary odometer value is lower than the standard engine revolutions per distance unit.

16. The method as claimed in claim 1 comprises the steps of:

recording a current odometer value and an average revolutions per current odometer value of the vehicle;

subtracting the initial odometer value from the current odometer value in order to conform the secondary odometer value; and comparing the average revolutions per secondary odometer value with the standard engine revolutions per distance unit in order to determine the outcome of a rental agreement.

17. The method as claimed in claim 16 comprises, wherein at least one surcharge is added to the car rental agreement as the final assessment, if the average revolutions per secondary odometer value is greater than the standard engine revolutions per distance unit.

18. The method as claimed in claim 16 comprises, wherein at least one discount is added to the car rental agreement as the final assessment, if the average revolutions per secondary odometer value is lower than the standard engine revolutions per distance unit.

19. The method as claimed in claim 1 comprises the steps of:

recording a current odometer value and an average revolutions per current odometer value of the vehicle;

subtracting the initial odometer value from the current odometer value in order to conform the secondary odometer value; and comparing the average revolutions per secondary odometer value with the standard engine revolutions per distance unit in order to determine the outcome of an insurance policy premium.

20. The method as claimed in claim 19 comprises, wherein at least one surcharge is added to the insurance policy premium as the final assessment, if the average revolutions per secondary odometer value is greater than the standard engine revolutions per distance unit.

* * * * *